Oct. 23, 1934.   W. A. PURTELL   1,978,372
HOLLOW SET SCREW AND METHOD OF AND APPARATUS FOR MAKING THE SAME
Filed March 28, 1932   2 Sheets-Sheet 1
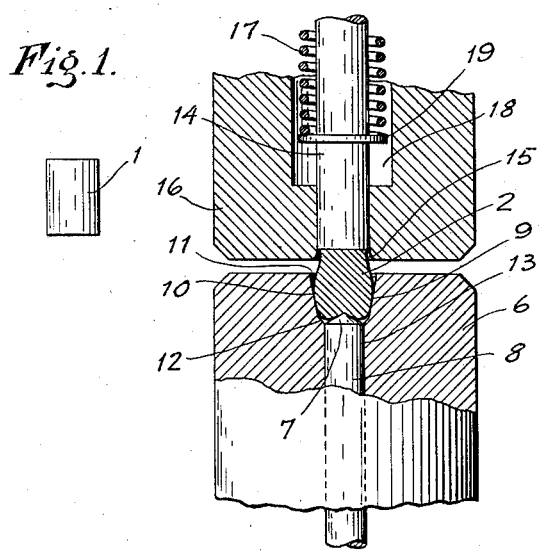
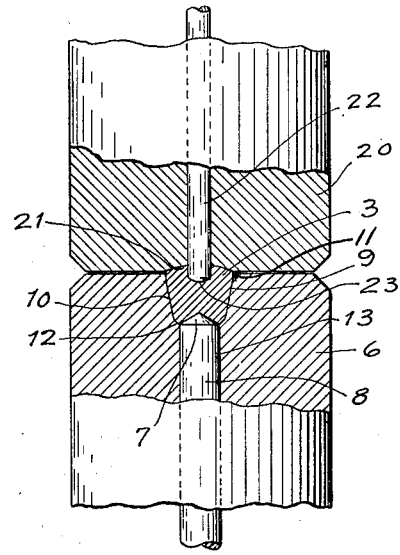
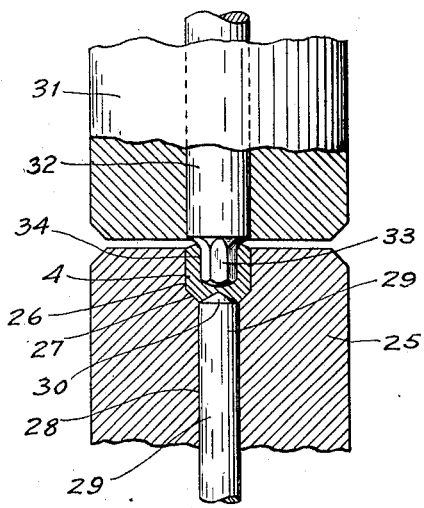
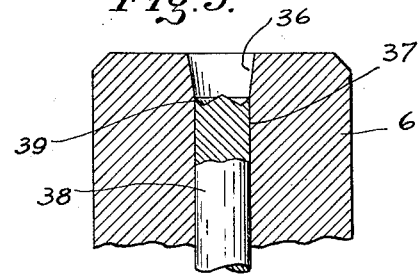
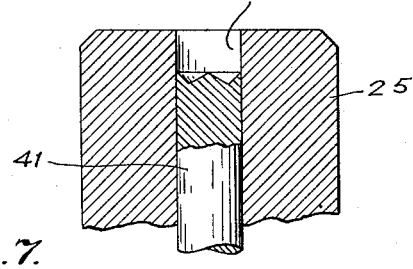
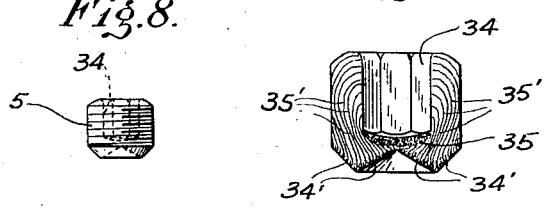
INVENTOR
WILLIAM A. PURTELL
BY
ATTORNEY.

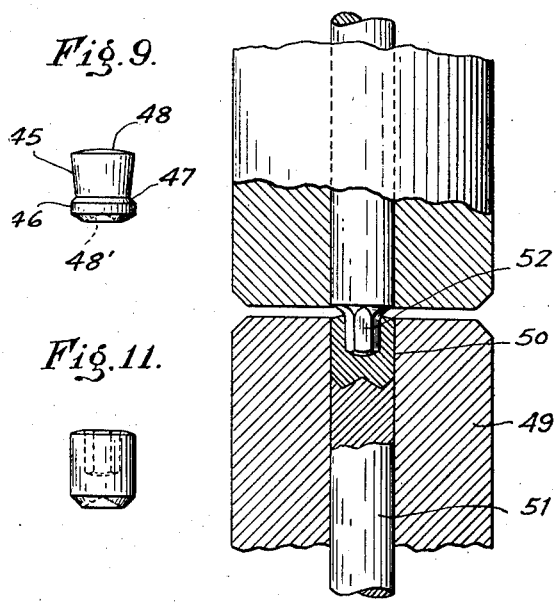
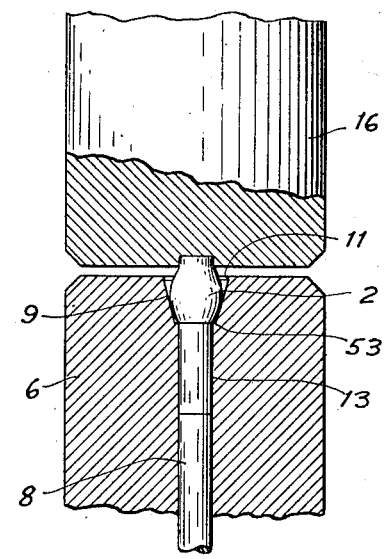
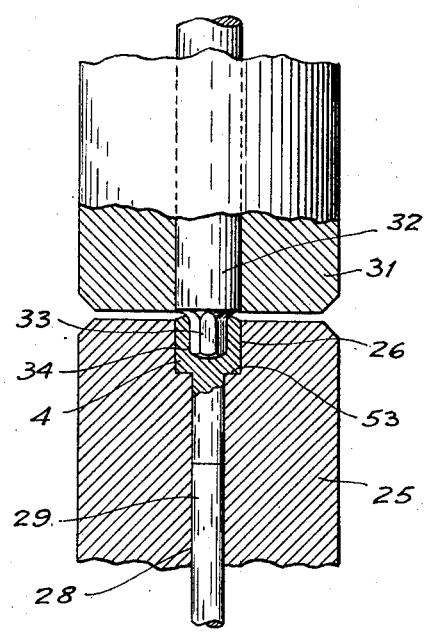
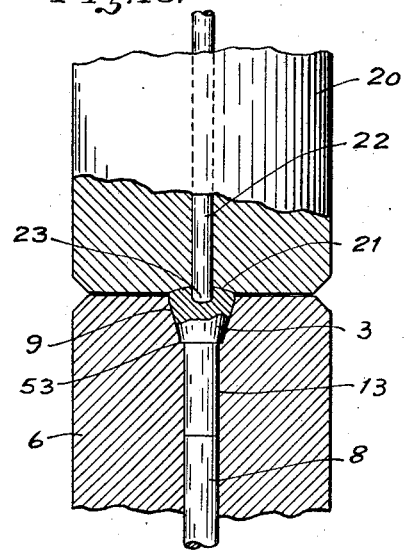

Patented Oct. 23, 1934

1,978,372

UNITED STATES PATENT OFFICE 1,978,372

HOLLOW SET SCREW AND METHOD OF AND APPARATUS FOR MAKING THE SAME

William A. Purtell, Hartford, Conn., assignor to The Holo-Krome Screw Corporation, a corporation of Connecticut Application March 28, 1932, Serial No. 601,549

40 Claims. (Cl. 10—10)

My invention relates to hollow set screws and methods of and apparatus for making the same.

In a co-pending application, I have heretofore proposed to socket hollow set screws by distributing the metal displaced by the punch in increasing quantity laterally as the socket is deepened and the blank is expanded laterally by the displaced metal, all in such manner as to produce an improved set screw and markedly improving the methods of apparatus for making the same. However, I have heretofore been unable to complete a set screw in the socket punching operation, i. e., to utilize only the punch and the stationary socketing die to complete the screw ready for threading, the same instead having an upper portion expanded laterally above the dies during upsetting and socketing and also having an uncupped lower end. As a result, the expanded portion on the upper end has had to be trimmed off, resulting in the cutting of some of the external fibers as well as loss of metal and an additional trimming operation, while an additional cupping operation has also been required.

My present invention has for its object to provide an improved set screw and, more particularly, an improved cupped screw of the general improved character heretofore produced but wherein none of the fibers in the blank are cut and all of the material in the blank is so utilized that the screw has an improved fibrous structure and greater strength in the socketed and cupped portion thereof. A further object of this invention is to provide an improved method of making such set screws whereby it is made possible to form the set screw completely in the die and to minimize the necessity for subsequent operations on the same and the trouble and expense incident thereto, while at the same time improving the quality of the set screw. A still further object of my invention is to provide an improved apparatus for making set screws whereby an improved product is produced with increased facility and reduced expense. These and other objects and advantages of my improved construction will, however, hereinafter more fully appear.

In the accompanying drawings I have shown for purposes of illustration certain forms which my invention may assume in practice.

In these drawings,—

Fig. 1 is a side elevation of the initial or wire blank used;

Fig. 2 is a side elevation partially in section showing the first step in the upsetting operation;

Fig. 3 is a similar view showing the second step in the upsetting operation;

Fig. 4 is a similar view showing the socketing operation;

Fig. 5 is a similar sectional view of a modified form of die and knockout pin which may be used in the upsetting operation;

Fig. 6 is a similar view showing a modified form of die and knockout pin which may be used in the socketing operation;

Fig. 7 is an enlarged sectional view of a set screw made with either of the die and knockouts disclosed, the same showing the fibrous structure of the same;

Fig. 8 is a side elevation of a finished set screw after threading;

Fig. 9 is a side elevation of a modified form of blank;

Fig. 10 is a view similar to Fig. 4 showing the socketing operation thereon;

Fig. 11 is a view similar to Fig. 7 showing a set screw resulting from the operation shown in Fig. 10, and Figs. 12, 13 and 14 are views similar to Figs. 2, 3 and 4 showing the corresponding steps in making a cap screw and the modifications incident to making such screws.

First referring to Figs. 1 to 4, it will be noted that ordinary round wire stock 1 is used as shown in Fig. 1, and that the same is cut in the form of a blank or section of any desired length, and subsequently upset to form the secondary blank illustrated at 2 in Fig. 2 and the modified blank shown at 3 in Fig. 3 and then socketed to produce the completed socketed blank shown at 4 in Fig. 4, which is subsequently threaded to produce the threaded complete set screw shown at 5 in Fig. 8.

Referring to Fig. 2 it will be noted that the blank 1 is placed in an aperture in a stationary lower die 6, preferably with its lower end resting upon an upper conical pointed end 7 on a knockout pin 8 in the die 6, and its upper end projecting beyond the upper surface of that die. More particularly, it will be noted that herein the die 6 is provided with a conical die aperture 9 in its upper face adapted to receive the lower end of the blank 1 and having a tapered wall 10 of uniform taper tapering outward toward the top of the die 6. If desired, this wall 10 may extend from top to bottom of the aperture, but herein it will be noted that the upper end of the same is provided with a short cylindrical portion 11 closely adjacent the top of the aperture and with a short inclined portion 12 at the bottom of the wall 11 which extends therefrom over to the edge of the knockout pin aperture 13 at the base of the conical end 7.

With the blank 1 disposed in the aperture 9 and its upper end projecting out of the same, the upper end of the same is struck from above by an upsetting member 14 which is preferably of cylindrical form and movable in a corresponding and slightly bellmouthed aperture 15 in a movable die 16. Further, it will be noted that the member 14 has a coiled spring 17 surrounding the same and disposed in an opening 18 in the die 16 and acting against a shoulder 19 on the member 14 in such manner as normally to tend to hold the latter member in a projected position while permitting the member 14 to be forced up into the position shown in Fig. 2 when the dies are brought together as illustrated. As a result of thus bringing the dies together, it will also be noted that the blank 1 is transformed into the secondary blank 2, which is slightly shorter than the blank 1 and provided with an upset or enlargement adjacent its lower end and a shallow indentation in its bottom formed by the conical end 7 on the knockout pin 8.

With the secondary blank 2 still in the die 6, the blank is next operated upon by a co-operating upsetting tool 20. The latter herein has a crown forming die aperture 21 in its lower face, and preferably, though not necessarily, also has an axially disposed preliminary indenting member 22 projecting below the surface 21. The preliminary punching member may have a working end of various forms adapted to insert preliminary shallow apertures of varying forms adapted to use under different conditions. Herein it will be noted that its working end 23 is of cylindrical cross section and smaller than the cross section of the completed socket and also provided with a blunt rounded extremity adapted to form the bottom of the preliminary punching, it being found that this form of working end tends to produce a satisfactory preliminary punching while reducing the amount of work required to be done by the socketing punch. It will also be noted that the crowning surface 21 on the die member 20 herein terminates substantially in the end surface of the member 20 and is adapted to provide a crowned end portion surrounding the preliminary punching and to co-operate effectively with the die aperture 9 in the die 6, whether the latter is provided with a cylindrical section 11 at its top or the tapered wall 10 thereof extends through to the upper surface of the die 6.

When the members 20 and 22 are brought down upon the modified blank 2 to the position illustrated in Fig. 3, it will be evident that the secondary blank 2 will be transformed into the further modified blank 3 which, it will be noted, then has a crowned top formed by the surface 21 on the die 20 and a shallow axial aperture in this crowned top formed by the member 22, as well as a complete conical indentation in its lower end formed by the surfaces 12 and 7 on the die aperture 9 and knockout pin, respectively. Here it will also be noted that the side wall of the blank is progressively expanded from a minimum diameter below the bottom of the socket to be formed therein, to the maximum diameter of the blank, here the cylindrical top, i. e. expanded gradually without abrupt changes in diameter. Here of course it will also be understood that the member 22 may also, if desired, be provided with a spring connection, such as described above in connection with Fig. 2, and that the operation of the same will then be as previously described.

After the above described blank has been formed the blank may be annealed if desired, although, as a result of my improvement, and the smaller amount of metal worked in a set screw, such an annealing operation is not ordinarily necessary in set screws of most sizes. However, in certain sizes of set screws, an anneal at this point in the process may be desirable and it will be understood that I contemplate the use of an anneal between the upsetting and socketing operations whenever desired.

After the modified blank 3 has thus been formed, the same is placed in a stationary socketing die 25 having a die aperture 26 in the upper face of the same. This aperture 26 is herein provided with a cylindrical wall and herein also has a short conical surface 27 leading from the lower end of the wall 26 to the bore 28 in which is disposed a knockout pin 29. The latter herein also has a conical upper end 30, similar to the end 7 on the pin 8, which is adapted to co-operate with the surface 27 in forming the cupped end of the screw. Associated with the die 25 is also an upper movable die 31 carrying a tool 32 provided with a hexagonal punch 33 protruding from its lower end, and adapted to enlarge the preliminary punched aperture in the upper end of the modified blank 3 into a substantially wider and deeper hexagonal socket 34 of uniform cross section, when the punch is moved into the position illustrated in Figure 4, i. e. in one operation transform the modified blank 3 into the completed blank 4. More particularly, it will be noted that during this operation the displaced metal is distributed in increasing quantity laterally at the bottom of the socket 34 as the latter is deepened, while the tapered side wall of the blank 3, formed by the wall 10, is expanded laterally by the displaced metal to form a body of cylindrical cross section on the completed blank. Further, it will be noted that the deep and wide socket 34 is inserted without substantially elongating the blank 3 and while leaving a crown top on the blank 4 and also simultaneously forming the desired cupped opposite end on the blank. In other words, the blank 3, as a result of this operation is formed into a completed screw blank ready for the threading operation which produces the completed screw shown in Figure 7.

Referring more particularly to Figures 7 and 8, it will be noted that as a result of my improvements, a set screw is produced which, at the same time that it has the desired crowned top, hexagonal socket, and cupped bottom, also has an improved internal or metal structure generally similar to the socketed head of the cap screw described in my application mentioned. More particularly, it will be observed that the screw has a compacted portion 35 formed of compacted core fibers in the bottom of its socket 34, and that it also has continuous fibers 35' extending laterally outward and around this compacted portion and into the walls of the socket 34, while the walls of the cup 34' are also compacted by pin and die action thereon, and all of the metal of the blank is present in the screw. It will also be noted that by reason of the working of the metal and the new fibrous structure, a screw is produced which is very strong not only in the walls of its socket but in the area surrounding the bottom of the socket and between the socket bottom and the cup in the end of the screw.

In Figures 5 and 6 I have illustrated modified forms of stationary dies and knockout pins which also may be used if desired with movable dies such as heretofore described, to produce the improved set screws. Referring first to Figure 5, wherein a modified upsetting die and its knockout pin are illustrated, it will be noted that the die aperture in this construction has a tapered wall 36, corresponding to the wall 10 in Figures 2 and 3, but extending clear to the top of the aperture and also down to the bottom of the aperture, where it directly joins an enlarged bore 37 in which the knockout pin 38 is disposed. Herein, the knockout pin is of larger diameter than the pin 8 and is also provided on its upper end with a portion 39 corresponding to the combined surfaces 12 and 7 provided on the die 6 and knockout pin 8 in the previous construction. Referring to Figure 6, it will also be noted that the socketing die 35 of this construction is provided with a die aperture 40 which is of cylindrical cross section throughout and adapted to receive the blank which is formed in the die of Figure 5, while the knockout pin 41 is also of the same construction as described above in connection with the knockout pin in Figure 5, and both the die aperture 40 and knockout pin 41 are of a diameter corresponding closely to the maximum diameter of the blank formed in the die aperture 36 of Figure 5. Obviously, the screw produced in these dies will be the same as that heretofore described and similarly formed, the principal difference being that the surfaces forming its cupped lower end are wholly on the knockout pins, rather than partially on the same and partially on the stationary dies as in the preceding construction. Here, as in that construction, it will of course also be evident that, if desired, an upsetting die aperture 36 may also be used having its taper extending only to adjacent the top of the die aperture 36.

In Figure 9, I have illustrated a further modified blank which may be used, if desired. This blank may be made in any suitable manner by suitable means not illustrated, as for example, by swedging, rolling, or turning, or in an open die, or combination of the same, as may be desired. As shown, it has a uniformly tapered portion 45 which extends from the extreme upper end of the blank below the bottom of the socket which is to be formed therein, and which is connected to a lower cylindrical body portion 46 of the same diameter as the maximum diameter of the portion 45, by a short oppositely tapered portion 47. Herein, the blank is also provided with a crowned upper end 48 while the opposite end thereof is initially cupped as at 48'. It will of course also be understood that, if desired, this blank may also be provided with a preliminary shallow punching in its crowned end, and that the blank may also be annealed before the blank is socketed.

In socketing such a blank, the same is disposed in a die 49 (Figure 10) having a die aperture 50 therein of cylindrical cross section generally similar to the die aperture 40 shown in Figure 6, and of substantially the maximum diameter of the portion 45 and of the portion 46 of the blank. Also it will be noted that a knock out pin 51 is shown having a conical upper end adapted to produce the desired cupped screw, and also a body fitting the lower end of the die aperture 50. Further, it will be noted that a hexagonal punch 52, generally similar to the punch 33, is inserted in the upper crowned end of the blank in the same manner as above described in connection with Figure 4. It will also be evident that when this punch is thus inserted, the metal flow will be substantially the same as that previously described as the socket is deepened, and result in filling out the tapered portions 45 and 47 on the blank to produce a socketed blank, see Figure 11, of the desired uniform cylindrical shape and requiring only threading to produce a complete screw.

Attention is here also directed to the fact that my improvements may also be utilized in making cap screws. To do this, only slight changes are required, the same including principally the omission of the cup forming surfaces on dies and/or knockout pins and providing stationary dies of either tapered type herein described which are also adapted to form a head while permitting the shank of the blank to extend down through the bottom land in the stationary dies and be supported on a knockout pin having a flat top, all as shown in my prior application mentioned. To illustrate my improvements as they would be used when applied to the making of cap screws, reference is made to Figures 12, 13 and 14 which correspond to Figures 2, 3 and 4, and are only marked with certain corresponding reference numerals and a new reference numeral 53 indicating the bottom land, as a more detailed description of these figures seems unnecessary. Here it will also be understood that if desired to obtain greater die life, this land 53 on the upsetting die 6 may be omitted, an aperture of the type shown at 36 in Figure 5 then being used, with, of course, a shorter knock-out pin 8 of the type shown in Figure 12. Obviously this would require no change in the die 25 shown in Figure 14.

As a result of my improvements, it will be observed that, while obtaining advantages described and claimed in my previous case including that of being able to perform all of the above operations while the metal is cold, I eliminate any weakening of my previous set screw resulting from turning or trimming down the same after the socket is inserted, at the same time that all waste of material involved in such a turning or trimming down operation is eliminated and a strong screw of improved fibrous structure is produced. Attention is further directed to the fact that at the same time that such an improved screw is produced, the same is also enabled to be produced with the desired cupped end in the same operations which form the rest of the screw. It will further be evident that the cost of manufacture is reduced not only by eliminating waste but also eliminating the several operations required in turning down the screws and cupping the same after socketing. It will, of course, also be evident that as a result of my improved method the several operations incident to forming the screws are facilitated by facilitating the metal flow and that there is thus a minimum of strain in the screw or on the machines upon which the dies are carried. These and other advantages of my improvements will, however, be clearly apparent to those skilled in the art.

In the claims herein where I claim the portion to be socketed as progressively expanded to the maximum diameter of the blank or progressively decreasing in diameter from the maximum diameter of the blank, it will be understood that I contemplate an expansion of or decrease in diameter which proceeds gradually without abrupt substantial change in diameter, although not necessarily in the form of a uniform taper; it being found desirable in certain sizes, for example, to utilize a slightly outwardly curved wall of this character and such, for example, as illustrated below the maximum diameter of the head in Figure 12, as distinguished from a uniform taper illustrated in Figures 3 and 13.

While I have in this application specifically described several embodiments which my improvements may assume in practice, it will be understood that these forms of the same are used for illustrative purposes, and that the invention may be further modified and embodied in various other forms without departing from its spirit or the scope of the appended claims.

What I claim as new and desire to secure by Letters Patent is:—

1. The step in punching a socket in a progressively expanded portion of maximum diameter at the top which consists in, distributing metal forced ahead of the punch during socketing in increasing quantity laterally at the bottom of the socket as the latter is punched in the larger end of said portion and while progressively expanding the portion being socketed laterally to the diameter of the top thereof substantially from top to bottom of said portion.

2. The step in punching a socket in a progressively expanded portion of maximum diameter at the top which consists in, distributing, while unheated the metal forced ahead of the punch during socketing in substantially uniformly increasing quantity laterally at the bottom of the socket as the latter is punched in the larger end of said portion and while substantially uniformly laterally expanding the portion being socketed from end to end of the socket therein.

3. The method of forming socket articles which consists in, forming a portion to be socketed progressively decreasing in diameter substantially from top to bottom from a maximum diameter at its top, and punching a socket in the larger end of said portion while progressively distributing metal forced ahead of the punch in increasing quantity laterally substantially from top to bottom of said portion to fill out the latter from top to bottom.

4. The method of forming socketed screws which consists in, forming a portion to be socketed progressively expanded below its top and having the top of said portion of the maximum diameter of the expansion thereof, and punching a socket in the top of said portion while forcing the displaced metal in advance of the punch and laterally to fill out said portion to substantially uniform diameter.

5. The method of forming socketed articles which consists in, forming a blank having a portion to be socketed progressively expanded substantially from end to end of the socket to be formed therein, and cold punching a socket in the larger end of said portion while forcing displaced metal ahead of the punch and laterally to fill out said portion.

6. The method of forming socketed articles which consists in, forming a blank having a progressively expanded portion to be socketed of the maximum external diameter of the blank adjacent the top of said portion and minimum external diameter adjacent the bottom thereof, and punching a socket in the larger end of said portion while forcing displaced metal ahead of the punch and laterally to fill out said portion.

7. The method of forming socketed screws which consist in, cold forming a blank progressively expanded substantially throughout the length of the socket to be formed therein and having its larger end of the maximum diameter of the expansion thereof, and cold punching a socket in the larger end of said blank while forcing displaced metal ahead of the punch and laterally to fill out said portion to substantially uniform diameter.

8. The method of forming socketed articles which consists in, forming a blank having a progressively expanded portion to be socketed and an end thereon of the maximum diameter of said portion, and punching a socket in said end while filling out said blank to uniform diameter throughout its length.

9. The method of forming socketed articles which consists in, forming a blank having a progressively expanded portion to be socketed and opposite ends of substantially the maximum diameter of said portion, and punch a socket in said portion while filling out said blank to uniform diameter throughout its length.

10. The method of forming socketed screws which consists in, forming a blank having a head progressively expanded substantially throughout the length of said head and of a maximum diameter at the top thereof equal to the maximum diameter of the expansion thereof, and punching a socket in said top while forcing displaced metal ahead of the punch and laterally to fill out said head to uniform diameter throughout its length.

11. The method of forming socketed screws which consists in, forming a blank having a progressively expanded portion to be socketed extending from beneath the bottom of the socket to be formed therein to the maximum diameter of the blank at the top thereof, and punching a socket of substantially uniform diameter inward through said portion of maximum diameter while the displaced metal is free to flow laterally from in advance of the punch to expand said portion to be socketed progressive substantially from top to bottom to said maximum diameter as the punch enters said portion.

12. The method of forming socketed screws which consists in, upsetting a blank to form a portion to be socketed progressively decreasing in diameter from the maximum diameter of said portion to below the bottom of the socket to be formed therein, punching an initial socket of substantially uniform diameter in said portion while progressively expanding the latter as the punch enters the same, and forming said socket into a polygonal socket.

13. The method of forming socketed articles which consists in, forming a blank having a portion to be socketed progressively expanded substantially throughout the length of said portion and of the maximum diameter of the blank at the top thereof, punching a shallow socket of substantially uniform diameter in said top, and punching a deeper and wider socket of uniform diameter in said top while forcing displaced metal ahead of the punch to fill out said portion to uniform diameter throughout its length.

14. The method of forming socketed set screws which consists in, forming a blank externally progressively decreasing in cross section from substantially the upper extremity thereof substantially to the opposite extremity thereof, and punching a socket in the larger end of said blank while forcing displaced metal ahead of the punch and laterally to fill out said blank.

15. The method of forming socketed set screws which consists in, forming a blank externally progressively expanded substantially from end to end thereof, and punching a socket in the larger end of said blank while forcing displaced metal ahead of the punch and laterally to fill out said blank to uniform diameter.

16. The method of forming socketed set screws which consists in, forming a blank externally progressively decreasing in cross section from substantially the upper extremity thereof to a point below the bottom of the socket to be formed therein while providing a shouldered portion below the bottom of the socket to be formed therein, and punching a socket in the upper end of said blank while filling out said blank to the diameter of said shouldered portion.

17. The method of forming socketed set screws which consists in, forming a blank having a portion to be socketed progressively expanded substantially from end to end of said portion and an indentation in the smaller end of said blank, and simultaneously socketing the larger end of said portion and cupping said indented end while filling out said portion.

18. The method of forming socketed set screws which consists in, forming a blank having a portion to be socketed externally progressively expanded substantially from end to end of said blank, and socketing the larger end of said portion while cupping the opposite end of the blank and filling out said portion.

19. The method of forming socketed set screws which consists in, forming a blank having a portion to be socketed progressively expanded substantially from end to end thereof and also having an indentation in the opposite ends of said blank, and socketing the larger end of said portion while cupping the opposite end of said blank and filling out said portion to uniform external diameter.

20. The method of forming socketed set screws which consists in, forming a blank of substantially the length of the set screw desired, providing a progressively expanded portion on said blank adapted to be filled out by metal displaced in punching, and punching a socket in the larger end of said portion while maintaining the blank of substantially the same length and filling out the same to substantially uniform diameter.

21. The method of forming socketed set screws which consists in, forming a blank of substantially the length of the set screw desired, providing a progressively expanded portion on said blank adapted to be filled out by metal displaced in punching while coning and cupping the end of the blank adjacent the bottom of the socket to be formed therein, and punching a socket in the larger end of said portion while maintaining the blank of substantially the same length and filling out the same to substantially uniform diameter and completing the coning and cupping thereof.

22. The method of forming socketed set screws which consists in, forming a blank of substantially the length of the set screw desired, progressively decreasing the diameter of said blank from a maximum diameter at substantially the upper extremity thereof to a point below the bottom of the socket to be formed therein, and socketing through the wider end of said blank to a point slightly above the bottom of the latter while filling out the blank to uniform diameter throughout its length.

23. The method of forming socketed set screws which consists in, forming a blank of substantially the length of the set screw desired, progressively decreasing the diameter of said blank from a maximum diameter at substantially the upper extremity thereof to a point below the bottom of the socket to be formed therein, and coning and cupping the lower end of said blank while socketing through the upper end and filling out said blank to uniform diameter above said coned and cupped end.

24. The step in forming hollow set screws from a blank having a progressively expanded portion to be socketed which consists in, simultaneously socketing and cupping the larger and smaller ends respectively of said blank while laterally filling out the expanded portion thereof to uniform external diameter.

25. A hollow set screw having in one end a punched socket of substantially uniform diameter for interlocking with a cooperating turning member, and a punched cup in the opposite end thereof, and also having compacted fibers forming the walls of both said socket and cup.

26. A hollow set screw having in one end a punched socket of substantially uniform diameter for interlocking with a cooperating turning member, and a punched cup in the opposite end thereof, and also having substantially unstretched and compacted fibers forming the walls of both said socket and cup.

27. A hollow set screw having in one end a punched socket of substantially uniform diameter for interlocking with a cooperating turning member, and a punched cup in the opposite end thereof, and also having compacted fibers between said socket and cup and continuous fibers extending laterally outwardly around said compacted fibers and forming the sides of the socket.

28. A hollow set screw having in one end a punched socket of substantially uniform diameter for interlocking with a cooperating turning member, and a punched cup in the opposite end thereof, and also having compacted fibers between said socket and cup and continuous fibers extending laterally outwardly around said compacted fibers and along the sides of the socket, said last mentioned fibers also being compacted and terminating in the side walls of said socket.

29. Apparatus for forming socketed articles comprising means for forming a portion to be socketed progressively expanded substantially from end to end of said portion and of a maximum diameter at its upper end equal to the maximum diameter of the expansion thereof, and means for socketing said portion while expanding said portion into substantially uniform diameter throughout the length of the socket therein.

30. Apparatus for forming socketed articles comprising means for upsetting a portion to be socketed progressively expanded substantially from end to end of said portion and of a maximum diameter at its upper end equal to the maximum diameter of the expansion thereof, and means for socketing said portion to be socketed comprising a die having an aperture of substantially uniform cross section receiving said portion and of substantially the maximum cross section thereof and a punch filling out said portion and aperture progressively from top to bottom as the punch advances into said portion.

31. Apparatus for forming socketed articles comprising upsetting mechanism for forming a portion to be socketed progressively expanded substantially from end to end of said portion and of a maximum diameter at its upper end equal to the maximum diameter of the expansion thereof and having an axial shank of substantially uniform diameter protruding from the end of minimum diameter thereof, and means for socketing said portion while expanding said portion into substantially uniform diameter throughout the length of the socket therein comprising a die aperture of uniform diameter receiving said portion and of substantially the maximum diameter thereof and having an axial aperture receiving said shank, a punch filling out said portion and first mentioned aperture progressively from top to bottom as the punch advances into said portion, and means in said axial aperture supporting said shank during the punching operation.

32. Apparatus for forming socketed articles comprising upsetting mechanism for forming a portion to be socketed progressively expanded substantially from end to end of said portion and of a maximum diameter at its upper end equal to the maximum diameter of the expansion thereof, and means for socketing said portion while expanding said portion into substantially uniform diameter throughout the length of the socket therein comprising a die aperture of uniform diameter receiving said portion and of substantially the maximum diameter thereof and having an axial aperture communicating with said die aperture, a punch filling out said portion and last mentioned aperture progressively from top to bottom as the punch advances into said portion, and means in said axial aperture supporting said portion during the punching operation while forming the end of minimum diameter of said portion.

33. Apparatus for forming socketed screws comprising upsetting means for forming a portion to be socketed of maximum diameter at the top of said portion and of progressively decreasing diameter from said maximum diameter to below the bottom of the socket to be formed therein, and mechanism for punching a socket of substantially uniform diameter through the top of said portion comprising a die aperture of uniform diameter and of substantially the maximum diameter of said portion receiving the latter, and a punch of substantially uniform diameter progressively expanding said portion to fill out said die aperture.

34. Apparatus for forming socketed screws comprising upsetting means for forming a portion to be socketed of maximum diameter at the top of said portion and of progressively decreasing diameter from said maximum diameter to below the bottom of the socket to be formed therein, and mechanism for punching a socket of substantially uniform diameter through the top of said portion comprising a die aperture of uniform diameter and of substantially the maximum diameter of said portion receiving the latter, and a punch of substantially uniform diameter progressively expanding said portion to fill out said die aperture, said first mentioned means including means for forming a shank on said portion of the minimum diameter of the latter and said die aperture having a communicating axial aperture in which said shank is supported during punching.

35. Apparatus for forming socketed articles comprising means for forming a blank of substantially the length of the finished article and having a portion to be socketed of progressively reduced diameter from a maximum diameter at substantially the top of the blank to a minimum diameter at a point below the bottom of the socket to be formed therein, and means for socketing through the upper end of said blank to a point slightly above the bottom of the said reduced portion while expanding said portion into substantially uniform diameter and maintaining said blank of substantially the same length.

36. Apparatus for forming socketed articles comprising means for forming a portion to be socketed progressively expanded substantially from end to end of said portion and of a maximum diameter at its upper end equal to the maximum diameter of the expansion thereof while forming a socket of uniform diameter in the larger end thereof, and means for deeper socketing said portion while expanding said socketed portion into substantially uniform diameter throughout the length of the socket therein.

37. Apparatus for forming socketed articles comprising means for upsetting a blank to form a secondary blank of progressively reduced diameter substantially from end to end, and means for socketing the larger end of said blank while cupping the smaller end of the same and laterally filling out said reduced portion.

38. Apparatus for forming socketed articles comprising means for upsetting a blank to form a secondary blank progressively expanded substantially from end to end and cupping the smaller end of said blank during upsetting, and means for socketing the larger end of said blank while completing the cupping operation and laterally filling out the expanded portion.

39. Apparatus for forming socketed articles comprising means for crowning and cupping opposite ends of the article while progressively expanding the sides thereof from the cupped end to the crowned end, and means for socketing and further cupping said opposite ends thereof while laterally filling out the expanded portion thereof.

40. Apparatus for forming socketed articles comprising means for upsetting a blank while initially cupping the same and forming a secondary blank, upsetting means for progressively expanding said blank and crowning and cupping the larger and smaller ends of the same, and means for socketing the larger end of said blank while further cupping the opposite end and laterally filling out the expanded portion thereof.

WILLIAM A. PURTELL.

CERTIFICATE OF CORRECTION.

Patent No. 1,978,372. October 23, 1934.

WILLIAM A. PURTELL.

It is hereby certified that error appears in the printed specification of the above numbered patent requiring correction as follows: Page 1, line 10, after "of" insert and; page 2, line 32, for "The" read This; page 4, line 27, claim 2, after "unheated" insert a comma; line 72, claim 7, for "consist" read consists; line 92, claim 9, for "punch" read punching; and line 114, claim 11, for "progressive" read progressively; page 5, line 32, claim 19, for "an indentation" read indentations; and that the said Letters Patent should be read with these corrections therein that the same may conform to the record of the case in the Patent Office.

Signed and sealed tl , 22nd day of January, A. D. 1934.

(Seal)

Leslie Frazer
Acting Commissioner of Patents.